Nov. 17, 1959 R. WEISS 2,912,914
PHOTOGRAPHIC SHUTTER AND DIAPHRAGM ADJUSTING MECHANISM
Filed Oct. 13, 1954
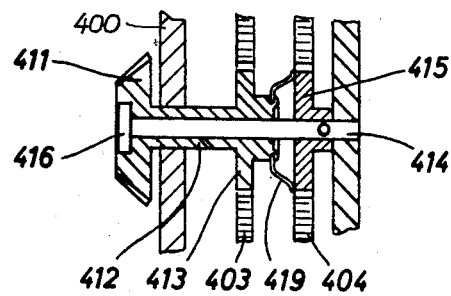
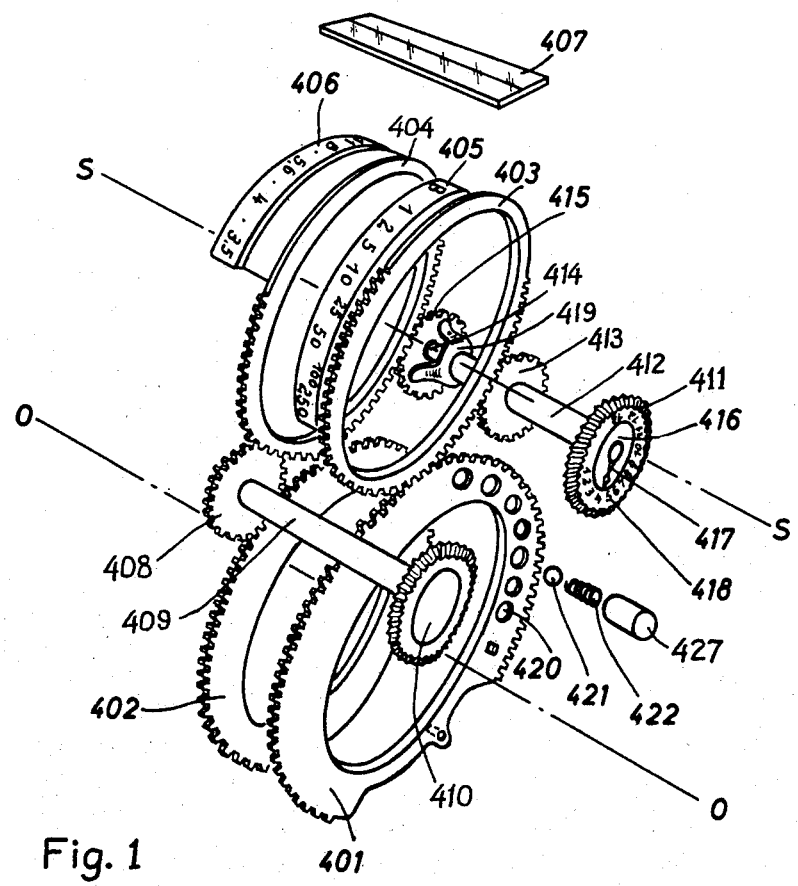

United States Patent Office 2,912,914
Patented Nov. 17, 1959

2,912,914

PHOTOGRAPHIC SHUTTER AND DIAPHRAGM ADJUSTING MECHANISM

Richard Weiss, Braunschweig, Germany, assignor to Franke & Heidecke, Fabrik Photographischer Prazisions-Apparate, Braunschweig, Germany, a German firm Application October 13, 1954, Serial No. 462,073

Claims priority, application Germany October 16, 1953

5 Claims. (Cl. 95—64)

The present invention relates to photographic cameras, and more particularly to the adjustment of the shutter speed and the diaphragm opening or aperture in photographic cameras of the type having a mirror reflex focusing and view finding chamber such as, but not limited to, the twin lens reflex cameras currently available on the market under the trademark "Rolleiflex."

An object of the invention is to provide simple and satisfactory mechanism, capable of easy and quick operation, for simultaneously adjusting the shutter speed and the diaphragm aperture or stop, in an opposite or complementary way, so that as the shutter speed is made faster (that is, making an exposure of shorter duration) the diaphragm aperture or stop is simultaneously opened wider to an extent sufficient to compensate for the faster shutter speed, and vice versa.

Another object of the invention is the provision of simple and satisfactory mechanism, easily and quickly operable, for adjusting the shutter speed and the diaphragm aperture relative to each other in a non-complementary manner, when desired, to vary the relationship between these two factors in accordance with varying conditions of illumination or other variables or exposure values, and also for varying or adjusting the two factors of diaphragm aperture and shutter speed in a complementary manner relative to each other, when desired, without affecting the exposure value.

A further object is the provision of adjusting mechanism of the kind above mentioned, particularly designed and adapted for use with a camera of the kind having a mirror reflex focusing and view finding chamber and especially such a camera of the twin lens reflex type.

A still further object is the provision of such adjusting mechanism so designed and constructed as to be operated by manual operating members closely similar to those heretofore used on one common type of twin lens reflex camera, and so designed and constructed that the visual indications are seen from above through an observation window in the same location as in the commonly used twin lens reflex camera just mentioned, in order that the operator may operate the new camera equipped with the present invention in a manner closely similar to the operations to which he is already accustomed in previous twin lens reflex cameras of the same general kind.

These and other desirable objects may be attained in the manner disclosed as an illustrative embodiment of the invention in the following description and in the accompanying drawings forming a part hereof, in which:

Fig. 1 is a skeletonized or diagrammatic perspective view of the operating or adjusting mechanism in accordance with one embodiment of the present invention, with conventional parts of the camera construction omitted for the sake of clarity; and Fig. 2 is a partial vertical section taken through a portion of the operating or adjusting mechanism shown in Fig. 1.

The same reference numerals throughout the several views indicate the same parts.

As already indicated, the present invention is intended especially for use with a photographic camera having a mirror reflex focusing and view finding chamber, the problems in connection with adjustment of shutter speed and diaphragm aperture in such cameras being somewhat different than with other types of cameras. The operator customarily holds a camera of this kind at chest level or waist level, and looks downwardly toward the viewing screen of the focusing and view-finding chamber when preparing to take the picture. In certain types of such cameras, the adjusting scales for the shutter speed and the diaphragm aperture or stop are visible through an observation window which faces upwardly near the front of the camera, so that the operator can see the indications visible through this window while looking downwardly toward the focusing screen, and the shutter speed and diaphragm adjustments are also made by finger-operated knobs accessible at the front of the camera. Hence one of the problems encountered in devising new adjusting mechanism for simultaneously adjusting the aperture and the shutter speed in a complementary manner, and also for adjusting them in a non-complementary manner, is to make the new adjusting mechanism in such form that at least the speed and aperture adjusting scales or indications will still be visible through an observation window located approximately in the same position as formerly, and so that the adjustments may still be accomplished by finger manipulation of adjusting knobs located in approximately the same position as formerly, in order that the operator, when using the new mechanism, may follow approximately the same pattern of convenient and easy operation to which he has already become accustomed in operating previous forms or models of cameras of the same beneral type.

While the present invention may be applied to various forms of twin lens reflex cameras, it is here disclosed by way of example as applied to a twin lens reflex camera of the kind identified by the trademark "Rolleiflex," manufactured by the firm of Franke & Heidecke, of Braunschweig, Germany, and widely known and used throughout the United States. Different models of this well known camera have varied in details from time to time, but the basic construction, at least of those parts with which the present invention is concerned, has remained essentially the same for several years past. The following disclosure of the invention presupposes familiarity with the main constructional features of the "Rolleiflex" camera. For those not already familiar with the construction of this camera, reference may be made to the book "Rollei Photography, Handbook of the Rolleiflex and Rolleicord Cameras" by Jacob Deschin, published in 1952, by Camera Craft Publishing Company, of San Francisco, California. Many of the constructional features of the camera are also disclosed in the pamphlet "Rolleiflex 2.8C in Practical Use" published in 1953 by the manufacturer, the above mentioned firm of Franke & Heidecke.

As will be readily understood by those familiar with the "Rolleiflex," this camera comprises two lenses, a lower or picture-taking lens with which a shutter is associated, and an upper or finder lens having no shutter. The shutter may be of any convenient form, such as the shutter marketed under the trademark "Compur," manufactured by the firm of Frierich Deckel, of Munich, Germany. The principal features of such a shutter are disclosed in United States Patent 1,687,123, granted October 9, 1928, for an invention of Deckel and Geiger. This shutter has, as usual, an adjustable iris diaphragm or stop adjusted by movement of the built-in adjusting member in a direction circumferentially or peripherally of the shutter casing, the diaphragm preferably being modified from conventional practice in such a way that equal angular movements of the adjusting member will produce equal proportionate changes in the aperture area. This may be accomplished, for example, as taught in U.S. Patent 871,654, granted November 19, 1907, on an application of Watkins and Woodhead, or in British Patent 464,892, accepted April 27, 1937, on an application of Zeiss Ikon A.G. The timing adjustment or speed adjustment of the shutter (controlled by the speed adjusting ring 63 in said Deckel and Geiger patent) is also preferably constructed in such manner (by properly constructing the shape of the control cam on this ring 63) that equal angular movements of the speed adjusting ring will produce equal proportionate changes in the time or duration of exposure.

The shutter and diaphragm adjusting mechanism of the present invention is similar to the constructions shown and described in the copending application of Hermann Bretthauer and Hermann Friedrich Albrecht, Serial No. 404,522, filed on January 18, 1954, and is designed to accomplish the same objects by means of a simplified construction.

With reference to the drawings, the optical axis of the picture taking lens and of its associated shutter is indicated by the broken line O—O, while the optical axis of the finder lens, located above and parallel to the optical axis of the picture taking lens, is indicated by the broken line S—S. The lenses themselves, as well as the shutter and the camera body, are omitted from Fig. 1 for the sake of clarity, it being understood that the two lenses and the shutter are carried by the camera front wall which is movable forwardly and backwardly (longitudinally of the two optical axes S—S and O—O) for purposes of focusing, by means of the usual focusing knob on the camera body.

Mounted on the camera front structure, a fragment of which is shown at 400 in Fig. 2, and extending outwardly therefrom in positions accessible for operation by the fingers of the operator, are the two adjusting knobs 410 and 411, shaped similarly to and occupying the same positions as the customary adjusting knobs already familiar in "Rolleiflex" cameras. However, in the "Rolleiflex" cameras as heretofore constructed, the left hand knob occupying the position of the knob 411 in the present drawings, serves to control the stop or diaphragm aperture, while the right hand knob occupying the position of knob 410 in the present drawings serves to control the shutter speed. (The terms "right" and "left" as here used refer to the respective right and left sides of the camera as normally held in front of the chest or waist of the operator, with the lenses pointing forwardly. Hence these terms are reversed with reference to the appearance in Fig. 1 of the drawings, which views the camera obliquely from the front.) In the present instance, however, the knobs 410 and 411, although of the same general shape and in the same locations as the speed and diaphragm adjusting knobs in the conventional "Rolleiflex" camera, serve different functions, as explained below.

The auxiliary or supplementary shutter speed adjusting ring 401 and the auxiliary or supplementary diaphragm aperture adjusting ring 402 both rotate on the shutter casing about the optical axis O—O as a center or axis, and the ring 401 is coupled in the usual manner to the built-in speed setting or time setting ring of the shutter (such as the ring 63 in the above noted Deckel and Geiger patent) while the diaphragm ring 402 is likewise coupled in the usual manner to the aperture adjusting member of the shutter (shown but not specifically described or numbered in said Deckel and Geiger patent). The speed adjusting member 401 is provided with peripheral gear teeth which engage with peripheral gear teeth on a drum or ring 403 which rotates about the upper lens axis S—S as a center, and which has a flange provided with a graduated scale 405 marked with the various shutter speeds. The diaphragm adjusting ring 402 is also provided with peripheral gear teeth which mesh with an intermediate pinion 408 which in turn engages the drum or ring 404. The ring 404, like the ring 403, rotates about the upper optical axis S—S as a center. This ring 404 has a flange provided with graduations or markings 406 showing the value of the aperture or stop for which the shutter diaphragm is set at any particular time, the scale 406 usually being graduated in terms of f number. The shutter speed or exposure scale graduations 405 and the diaphragm scale graduations 406 are both visible, when looking downwardly from above, through a sight window indicated diagrammatically at 407, and corresponding in location to the speed and aperture sight window which is familiar and customary in "Rolleiflex" cameras.

The rings 401, 402, 403, and 404, together with the scales 405 and 406 and the sight window 407, are substantially the same as in the "Rolleiflex" cameras already in use, and perform the same functions of adjusting and indicating the adjustment of the shutter speed and the diaphragm aperture, so they need not be further described.

For convenience of description, the two rings 401 and 403 may be referred to as rings constituting a first pair, and the adjusting knob 411 may be called the first adjusting knob. The two rings 402 and 404 may be called the rings of a second pair, and the adjusting knob 410 which operates them may be called the second adjusting knob. This nomenclature is, of course, only for convenience of description, and it is apparent that either pair of rings could be the shutter speed adjusting rings, the other pair being the diaphragm aperture adjusting rings.

According to the present invention, the finger knob 410 is fixed to the front end of a shaft 409 which is journaled in suitable stationary bearings supported from the camera front member 400, and which carries the intermediate pinion 408 fixed to the shaft 409 and in meshing engagement with the peripheral teeth on the rings 402 and 404. By turning the knob 410 by finger pressure, the ring 402 may be turned through the pinion 408 to vary the stop or diaphragm aperture. The pinion 408 also turns the ring 404 to bring the appropriate part of the scale 406 beneath the observation window 407, to show the operator the particular diaphragm aperture which has been set.

The other finger knob 411 is fixed to the front end of a tubular shaft 412 which is likewise journaled in stationary bearings carried by or supported from the camera front member 400. The shaft 412 has a pinion 413 fixed to the shaft and meshing with the peripheral teeth on the shutter speed ring 403. Rotation of the knob 411 by finger pressure causes the pinion 413 to turn the ring 403 until the desired shutter speed setting is visible through the observation window 407 while at the same time rotating the ring 401 to vary the shutter speed.

As best seen in Fig. 2, a shaft 414 extends centrally through the shaft 412 and is rotatable relative thereto. To the rear portion of the shaft 414 is fixed a pinion 415 which meshes with the peripheral teeth on ring 404 while the front end of the shaft 414 has an enlarged portion or disk 416 which is disposed within a circular recess formed in the front face of the finger knob 411. The disk 416 carries a pointer or index mark 417 which cooperates with a graduated scale 418 on the front face of the knob 411. The scale 418 is preferably graduated in terms of what may be called a total exposure value or integrated exposure value or light value representing the integrated result of exposure requirements when taking into account the film speed or sensitivity, and the particular light or illumination conditions, modified by filter factor, if any, and thus representing a particular series of mutually dependent or complementary relationships between shutter speed and diaphragm aperture, but independent of absolute values of either shutter speed or diaphragm aperture.

Fixed to the inner or rear end of the tubular shaft 412 is a friction clutch 419 having a plurality of resilient arms which operatively engage with the front face of the pinion 415, thus coupling the shafts 412 and 414. Because of this friction clutch coupling, the pinions 413 and 415 will tend to rotate in unison, and thus any rotary motion imparted to the speed ring 403 will tend to produce corresponding rotary motion of the aperture ring 404, and vice versa. But if sufficient resistance is offered to the rotation of one of the rings, the friction clutch 419 will slip and the two rings will not turn together.

Normally there is comparatively little frictional resistance to turning the diaphragm aperture rings 402 and 404. Therefore, when the shutter speed rings 401 and 403 are positively turned by manipulating the adjusting knob 411, the frictional resistance to turning the rings 402 and 404 is so slight that sufficient force will be transmitted through the clutch 419, without any slipping of the clutch, and so the diaphragm aperture rings 402 and 404 will be turned or adjusted concomitantly with the adjustment of the shutter speed rings, and in a complementary manner, as above explained. However, if the operator desires to change the shutter speed without changing the diaphragm aperture, then finger pressure can be applied to the knob 410 to hold this knob stationary, while the knob 411 is turned, and the resistance thus offered by holding the knob 410 stationary will cause the clutch 419 to slip so that only the speed rings 401 and 403 will be turned, without moving the rings 402 and 404.

On the other hand, in the normal construction of a photographic shutter of the kind above mentioned, there is considerably more resistance to turning the speed adjusting or setting ring, than there is to turning the diaphragm aperture adjusting ring. The resilient arms of the spring clutch 419 are made of such size and resilience that the power transmitted through the friction clutch is less than the normal frictional resistance to turning the speed adjusting rings 401 and 403. Therefore, when the operator turns the knob 410, this will cause rotation of the aperture rings 402 and 404, but the clutch 419 will slip and there will normally be no rotation of the shutter speed rings 401 and 403.

It may be desirable to increase purposely the resistance of the rings 401 and 403, so that there will be no possibility of the clutch failing to slip at the proper time and no possibility of turning the speed rings 401 and 403 when the knob 410 is turned. Of course this additional friction could be applied by manually holding the knob 411 in stationary position while turning the knob 410. But it is preferable to have a built-in frictional resistance or detent mechanism, such as a series of depressions or apertures 420 in the ring 401, engageable by a detent member such as the ball 421, resiliently pressed against the apertured face of the ring 401 by a spring 422, the ball and spring being mounted in a cup-shaped or cylindrical member 427 which is held in suitable position on a suitable stationary part of the camera structure, such as the camera front member 400. The angular displacement between successive depressions or apertures 420 corresponds to the angular displacement between successive shutter speed graduations on the graduated drum 405 of the ring 403, so that when one of these graduations is alined with the observation window 407, the detent ball 421 will be seated in one of the depressions 420, and when the shutter speed is adjusted to bring the next speed graduation into alinement with the observation window 407, the detent 421 will be seated in the next depression, and so on.

Thus, both because of the normal frictional resistance to turning the speed setting members of the shutter, and because of the extra frictional resistance built into the construction by the parts 420, 421, etc., it is seen that turning of the finger knob 410 will result in adjusting only the diaphragm aperture, because the clutch 419 will slip and will not transmit sufficient force to turn the speed rings 401 and 403. But when the finger knob 411 is turned, this knob, being directly coupled to the speed rings 401 and 403, will produce the desired adjustment of the speed rings 401 and 403, and at the same time the friction clutch 419 will transmit sufficient force to overcome the relatively slight friction of the diaphragm aperture adjusting parts, and will cause corresponding complementary adjustment of the diaphragm aperture, unless the knob 410 is purposely held in stationary position. In that event, the knob 411 will adjust only the shutter speed, without effecting the diaphragm aperture. Also, when the diaphragm ring reaches the limit of its adjusting motion, the speed ring can still be adjusted to a further extent, if necessary, as the clutch will slip.

In operation, the operator first determines the correct total exposure value or light value, as for example by reference to a photoelectric light meter and taking into account the film speed or sensitivity and the proper filter factor, if any filter is to be used, or by reference to an exposure table or guide which is marked in terms of total exposure values or light values rather than in the conventional terms of shutter speed and aperture. If the pointer 417 does not already point to the desired light value numeral on the scale 418, the finger knob 410 may be turned until the pointer 417 lies opposite the appropriate light value on the scale 418. Or the same result may be attained by turning the knob 411 while holding the knob 410 stationary, until the pointer 417 is at the desired scale graduation.

The operator may now turn the finger knob 411 (releasing the knob 410, if it has previously been held stationary) to adjust simultaneously, but in a complementary manner, both the shutter speed and the diaphragm aperture, to any desired setting of either one of these factors, the other one being automatically adjusted at the same time to the proper value while maintaining the previous setting of the exposure scale or light value scale 418. By turning the finger knob 411 in one direction, the shutter speed is increased (with decrease in duration of exposure) by action of the pinion 413 on the ring 403 which in turn meshes with the ring 401, while at the same time the diaphragm aperture is increased to compensate for the increased shutter speed, by action of the pinion 415 on the ring 404 which in turn rotates the diaphragm ring 402 by means of the pinion 408. If the finger knob 411 is turned in the opposite direction, the shutter speed is decreased and the diaphragm aperture is closed down or made smaller to compensate for the slower speed or longer duration of exposure. In either case movement of the knob 411 is limited only by the pinion 413 or 415 reaching an end portion of the peripheral gear teeth on the ring 403 or 404.

These various adjustments are accomplished easily and quickly and by manipulation of knobs in locations already familiar to the operator of cameras of this general type, the result being observed through the window 407 in a location already familiar to the operator. Hence the operator has a minimum of new manipulations to learn, with a maximum of old operating habits and techniques still to be followed. Thus the advantages of using an integrated exposure value scale may be obtained without requiring any radical departure from the operating techniques already familiar to users of "Rolleiflex" cameras.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera of the twin lens reflex type having a picture taking lens axis and a finder lens axis parallel to each other and having a first pair of rings operatively connected to each other to rotate together, one rotatable about the taking lens axis and the other rotatable about the finder lens axis as a center of rotation, a second pair of rings operatively connected to each other to rotate together, one rotatable about the taking lens axis and the other rotatable about the finder lens axis as a center of rotation, rotation of said rings of one pair serving to adjust shutter speed and rotation of said rings of the other pair serving to adjust diaphragm aperture, a pair of manually operable adjusting knobs lying on opposite sides of a common plane containing both of said lens axes, a shaft and gear operatively connecting the first of said adjusting knobs to the rings of the first pair to turn the rings of that pair by manual rotation of said first adjusting knob, and a shaft and gear operatively connecting the second of said adjusting knobs to the rings of the second pair to turn the rings of the second pair by manual rotation of said second knob, characterized by a gear coaxial with said first knob and its shaft and meshing with one of the rings of said second pair, a friction clutch operatively connecting said last named gear to the shaft of said first knob to tend to turn therewith, and a resilient detent tending to hold said first pair of rings against rotation with a holding force greater than the force which can be transmitted through said friction clutch and less than the force which can be applied to said first pair of rings by manually turning said first adjusting knob, so that when said first adjusting knob is manually turned, the first pair of rings will be turned with sufficient force to overcome said resilient detent and the second pair of rings will be simultaneously turned by force transmitted through said friction clutch to said last named gear, and when said second adjusting knob is manually turned, the second pair of rings will be turned thereby and the first pair of rings will remain stationary because the resistance offered by said resilient detent will cause said friction clutch to slip.

2. A photographic camera of the twin lens reflex type having a picture taking lens axis and a finder lens axis parallel to each other and having a first pair of rings operatively connected to each other to rotate together, one rotatable about the taking lens axis and the other rotatable about the finder lens axis as a center of rotation, a second pair of rings operatively connected to each other to rotate together, one rotatable about the taking lens axis and the other rotatable about the finder lens axis as a center of rotation, rotation of said rings of one pair serving to adjust shutter speed and rotation of said rings of the other pair serving to adjust diaphragm aperture, a pair of manually operable adjusting knobs lying on opposite sides of a common plane containing both of said lens axes, a shaft and gear operatively connecting the first of said adjusting knobs to the rings of the first pair to turn the rings of that pair by manual rotation of said first adjusting knob, and a shaft and gear operatively connecting the second of said adjusting knobs to the rings of the second pair to turn the rings of the second pair by manual rotation of said second knob, characterized by the fact that the shaft of said first knob is of tubular form, and further characterized by an inner shaft rotatable within said tubular shaft and projecting therefrom at one end, a gear fixed to the projecting end of said inner shaft and meshing with one of the rings of said second pair, a spring finger fixed to said tubular shaft and pressing against said gear to constitute a friction clutch operatively connecting said gear and inner shaft to said tubular shaft, and resilient detent means tending to hold said first pair of rings against rotation with a holding force greater than the force which can be transmitted through said friction clutch and less than the force which can be applied to said first pair of rings by manually turning said first adjusting knob, so that when said first adjusting knob is manually turned, the first pair of rings will be turned with sufficient force to overcome said resilient detent means and the second pair of rings will be simultaneously turned by force transmitted through said friction clutch to said last named gear, and when said second adjusting knob is manually turned, the second pair of rings will be turned thereby and the first pair of rings will remain stationary because the resistance offered by said resilient detent means will cause said friction clutch to slip.

3. A photographic camera of the twin lens reflex type having a picture taking lens axis and a finder lens axis parallel to each other and having a first pair of rings operatively connected to each other to rotate together, one rotatable about the taking lens axis and the other rotatable about the finder lens axis as a center of rotation, a second pair of rings operatively connected to each other to rotate together, one rotatable about the taking lens axis and the other rotatable about the finder lens axis as a center of rotation, rotation of said rings of one pair serving to adjust shutter speed and rotation of said rings of the other pair serving to adjust diaphragm aperture, a pair of manually operable adjusting knobs lying on opposite sides of a common plane containing both of said lens axes, a shaft and gear operatively connecting the first of said adjusting knobs to the rings of the first pair to turn the rings of that pair by manual rotation of said first adjusting knob, and a shaft and gear operatively connecting the second of said adjusting knobs to the rings of the second pair to turn the rings of the second pair by manual rotation of said second knob, characterized by the fact that the shaft of said first knob is of tubular form, and further characterized by an inner shaft rotatable within said tubular shaft and projecting therefrom at one end, a gear fixed to the projecting end of said inner shaft and meshing with one of the rings of said second pair, a spring finger fixed to said tubular shaft and pressing against said gear to constitute a friction clutch operatively connecting said gear and inner shaft to said tubular shaft, an exposure value scale marked on said first knob, pointer means fixed to said inner shaft and located adjacent said scale to indicate with reference to said scale the relative positions of orientation of said tubular shaft and inner shaft with respect to each other, and resilient detent means tending to hold said first pair of rings against rotation with a holding force greater than the force which can be transmitted through said friction clutch and less than the force which can be applied to said first pair of rings by manually turning said first adjusting knob, so that when said first adjusting knob is manually turned, the first pair of rings will be turned with sufficient force to overcome said resilient detent means and the second pair of rings will be simultaneously turned by force transmitted through said friction clutch to said last named gear, and when said second adjusting knob is manually turned, the second pair of rings will be turned thereby and the first pair of rings will remain stationary because the resistance offered by said resilient detent means will cause said friction clutch to slip.

4. Photographic camera setting mechanism comprising a first rotary ring and a second rotary ring both rotatable about a common lens axis, one of said rings being rotatable in accordance with changes in shutter speed setting and the other of said rings being rotatable in accordance with changes in diaphragm aperture setting, a first rotary shaft of tubular form extending substantially parallel to said lens axis, a first setting knob fixed to said first shaft and accessible for manual turning, a positive gear connection between said first shaft and said first ring to turn said first ring by turning movement of said first knob, a second rotary shaft also extending substantially parallel to said lens axis in a position offset from said first shaft, a second setting knob fixed to said second shaft and accessible for manual turning, a positive gear connection between said second shaft and said second ring to turn said second ring by turning movement of said second knob, a third rotary shaft coaxial with said first shaft and rotatably mounted in part within said first shaft, a positive gear connection between said third shaft and said second ring, a friction clutch operatively connecting said first shaft and said third shaft to each other to tend to turn one by rotation of the other, resistance means for resisting turning of said first ring with resistive force greater than the force which can be transmitted through said friction clutch, the resistance to turning said second ring being less than the force which can be transmitted through said friction clutch, an exposure value scale on said first knob, and pointer means secured to and turning with said third shaft for cooperation with said exposure value scale to indicate visually the relative positions of said first and third shafts.

5. Photographic camera setting mechanism comprising a first rotary ring and a second rotary ring both rotatable about a common lens axis, one of said rings being rotatable in accordance with changes in shutter speed setting and the other of said rings being rotatable in accordance with changes in diaphragm aperture setting, a first rotary shaft of tubular form extending substantially parallel to said lens axis, a first setting knob fixed to said first shaft and accessible for manual turning, a positive gear connection between said first shaft and said first ring to turn said first ring by turning movement of said first knob, a second rotary shaft also extending substantially parallel to said lens axis in a position offset from said first shaft, a second setting knob fixed to said second shaft and accessible for manual turning, a positive gear connection between said second shaft and said second ring to turn said second ring by turning movement of said second knob, a third rotary shaft coaxial with said first shaft and rotatably mounted in part within said first shaft, a positive gear connection between said third shaft and said second ring, a friction clutch operatively connecting said first shaft and said third shaft to each other to tend to turn one by rotation of the other, resistance means for resisting turning of said first ring with resistive force greater than the force which can be transmitted through said friction clutch, the resistance to turning said second ring being less than the force which can be transmitted through said friction clutch, said first knob having in its front face a circular recess concentric with said first and third shafts, an exposure value scale marked on the front face of said first knob around said recess, a disk-like part fixed to said third shaft and lying in and rotatable within said recess, and an index mark on said disk-like part for cooperation with said exposure value scale to indicate visually the relative positions of said first and third shafts.

References Cited in the file of this patent

UNITED STATES PATENTS

| | | |
|---|---|---|
| 2,209,156 | Fischer | July 23, 1940 |
| 2,241,017 | Kuppenbender et al. | May 6, 1941 |
| 2,342,819 | Priesemann | Feb. 29, 1944 |
| 2,509,385 | Ziaylek | May 30, 1950 |
| 2,596,328 | Dorsey | May 13, 1952 |

FOREIGN PATENTS

| | | |
|---|---|---|
| 519,590 | Germany | Mar. 7, 1931 |
| 655,518 | Germany | Dec. 30, 1937 |
| 666,365 | Germany | Oct. 18, 1938 |
| 826,407 | Germany | July 17, 1952 |
| 849,953 | Germany | Sept. 18, 1952 |
| 290,320 | Switzerland | Aug. 1, 1953 |